(12) United States Patent
Anand (10) Patent No.: US 8,195,085 B2
(45) Date of Patent: *Jun. 5, 2012

(54) METHOD OF DEVELOPING EDUCATIONAL MATERIALS BASED ON MULTIPLE-CHOICE QUESTIONS

(76) Inventor: Indu Anand, Chelmsford, MA (US)

(*) Notice: Subject to any disclaimer, the term of this patent is extended or adjusted under 35 U.S.C. 154(b) by 1127 days.

This patent is subject to a terminal disclaimer.

(21) Appl. No.: 11/350,266

(22) Filed: Feb. 7, 2006

(65) Prior Publication Data
US 2006/0194182 A1 Aug. 31, 2006

Related U.S. Application Data

(63) Continuation-in-part of application No. 09/951,132, filed on Sep. 12, 2001, now Pat. No. 7,033,182.

(60) Provisional application No. 60/232,110, filed on Sep. 11, 2000.

(51) Int. Cl.
*G09B 11/00* (2006.01)

(52) U.S. Cl. ........................................ 434/353; 434/323

(58) Field of Classification Search ................. 434/322, 434/307 R, 118, 323, 350, 362, 365
See application file for complete search history.

(56) References Cited

U.S. PATENT DOCUMENTS

| | | | |
|---|---|---|---|
| 6,018,617 A * | 1/2000 | Sweitzer et al. | 358/1.15 |
| 6,315,572 B1 * | 11/2001 | Owens et al. | 434/322 |
| 6,364,667 B1 * | 4/2002 | Heinberg et al. | 434/322 |
| 6,393,253 B1 * | 5/2002 | Kitabatake | 434/350 |
| 6,986,664 B1 * | 1/2006 | Thomas | 434/322 |

* cited by examiner

*Primary Examiner* — Kathleen Mosser
(74) *Attorney, Agent, or Firm* — Wolf Greenfield & Sacks, P.C.

(57) ABSTRACT

The present invention comprises methods of developing and implementing educational products or materials, including testing products or materials, by utilizing multiple-choice questions. Starting with a given set of facts to be presumed in a question, the method may require one to examine each answer choice, and inquire how a set of facts to be presumed could be modified to make that answer choice the "correct" or "best" answer choice. If a given answer choice is already correct, no modification is needed. If a given answer choice is not correct, various modifications may be employed, including changing some of the words or phrases, or other symbols or objects within the set of facts to be presumed.

21 Claims, 2 Drawing Sheets

METHOD OF DEVELOPING EDUCATIONAL MATERIALS BASED ON MULTIPLE-CHOICE QUESTIONS

CROSS-REFERENCE TO RELATED APPLICATIONS

This application is a continuation-in-part of U.S. patent application Ser. No. 09/951,132, filed Sep. 12, 2001, which claims the benefit of U.S. Provisional Patent Application Ser. No. 60/232,110, filed Sep. 11, 2000.

The entire contents of application Ser. No. 09/951,132 and Provisional Application Ser. No. 60/232,110 are hereby incorporated by reference.

FIELD OF THE INVENTION

The present invention relates generally to multiple-choice questions, and more specifically to a method of generating a class of educational materials, including educational testing materials, based on multiple-choice questions.

BACKGROUND OF THE INVENTION

In spite of the drawbacks of multiple-choice testing format, well-recognized in the educational testing industry, multiple-choice questions remain a common way of testing students in a variety of subject areas, particularly in examinations taken by large numbers of students. The words "student," "examinee" and "test-taker" are used in the context of educational testing synonymously hereinafter.

In its most commonly used form, a multiple-choice question comprises three identifiable sections: a section containing a set of facts to be presumed (for instance, a narrative, a short story, a poem, an expression, an equation, or a geometric figure), an interrogative sentence (sometimes known as the "call of the question"), and a set of answer choices.

A multiple-choice question may conveniently be divided into two parts—a first part, comprising a set of facts to be presumed and an interrogative sentence, and a second part, comprising a set of answer choices. The first part may also be termed a "query." (The term "query" can alternatively refer to the interrogative sentence alone, but as used herein, the term "query" refers to the entire first part of the question (i.e., both the set of facts to be presumed and the interrogative sentence), unless otherwise noted. In the second part, between three and five answer choices are typically presented, although the number of answer choices may vary below three or above five under appropriate circumstances. (For instance, in a so-called "true/false question," there are typically two answers: "true" and "false.")

The set of facts to be presumed may be expressed using words or phrases, or a set of objects or symbols, or a combination of words, objects and symbols. Alternatively, the set of facts to be presumed may be expressed in any other appropriate way, such as with a figure, a picture, or another graphical representation. (For instance, in an art history exam, the set of facts to be presumed may constitute a piece of art or a picture thereof.) The interrogative sentence typically asks the student or examinee to pick the "correct," or the "best," answer, and to indicate the selected answer choice either on the exam paper, for instance, by circling the selected answer choice, or on a separate answer sheet. The separate answer sheet may include a small shape, such as a small circle, oval or rectangle, corresponding to each answer choice of each question, which shape may be filled in by the examinee, for instance with a pencil. Typically, the examinee is asked to fill in the shape corresponding to the selected answer, while leaving blank the shapes corresponding to the question's other answer choices. Other answer sheets may have any other appropriate configuration now known or later developed. In most cases, the examinee may leave a question unanswered, but may not select more than one answer choice per question. Thus, a multiple-choice question generally has no more than one valid answer. In other cases, where multiple valid answers exist, various answers may yield either full credit or varying amounts of partial credit, and methods disclosed herein may be extended in a recursive, analogous manner.

Indication of answers on a separate answer sheet is popular, being suitable for automatic or machine grading of the answer sheets; the automatic or machine grader compares a given answer sheet with the template of "correct" answers and counts the number of questions where the filled-in shapes (for instance) match the template. The examinee's score, also sometimes called the "grade," may then be computed based on a formula that may depend on the number of questions answered correctly versus the number of questions answered incorrectly. Undoubtedly, the low cost, high speed, convenience and uniformity with which multiple-choice tests can be graded contribute to their popularity.

Implicit in the typical scoring formulas for multiple-choice tests is an assumption that examinees with a mastery of the subject matter will work efficiently to select the correct answers, whereas those who depend largely on guesswork will not do much better than the statistical odds of hitting the correct answers at random. However, in practice, the distinctions between the examinees' scores are rarely as clear-cut, due to quirks of the multiple-choice format. Specifically, an examinee unfamiliar with the tested material can beat the statistical obstacles to a high score by relying, at least in part, on guesswork—if the examinee is able to eliminate one or more incorrect answer choices and "guess" from a smaller pool of possible answers. On the other hand, an examinee who understands the tested material well may inadvertently choose an incorrect answer, despite that understanding, because of a minor error in analysis or computation. Such an error, no matter how minor, will often lead to a complete loss of credit for the question, if it results in selection of an incorrect answer choice. In short, the typical multiple-choice testing format provides little room for demonstrating the soundness of the underlying analysis or the accuracy of computation except in the final answer.

In a common scenario, total loss of credit may result from, for example, an incorrect answer choice being selected in lieu of the correct answer choice, based on the distinction of a single word, phrase, value or fact in the question (even though the examinee understood the question). For example, if a multiple-choice question asks an examinee to calculate the volume of a box having sides of 1 foot, 2 feet and 3 feet, the correct answer is the product of the three lengths, or 6 cubic feet. An examinee who understands the question may inadvertently choose the incorrect answer "9 cubic feet" if he or she misreads the "2" as a "3." Thus, the very ease and simplicity of selecting and recording an answer to a multiple-choice question may obscure the difference between knowledge and ignorance on the examination.

The alternatives to multiple-choice tests that allow an examinee to demonstrate grasp and knowledge of the subject matter generally require "open format" answers to the questions, which are commonly in the form of short or long paragraphs or essays. Answers in this format may provide the scope to the examinee to include technical, subject-matter-specific language and depictions, such as chemical or mathematical formulas or equations, graphics, charts, tables and other symbolic constructs or representations as evidence of knowledge and understanding.

This type of "open format" testing provides ample room to the test-takers to demonstrate their command of the subject matter, but it is time consuming to take and to grade. Because of the time constraints, this format typically requires a smaller number of questions to be asked on an examination, and therefore, generally for a smaller subset of the subject matter to be tested. Furthermore, the grading of open format tests is often more expensive, subjective and non-uniform than the grading of multiple-choice tests. These disadvantages severely limit the use of such existing alternatives to "standardized" multiple-choice format examinations, especially in the context of large-scale, national examinations.

Thus, there exists a need for a test generation methodology that combines the breadth of scope, the uniformity, the efficiency and ease of grading of "objective" or "standardized" multiple-choice tests with the confidence and reliability of the "measures of knowledge and understanding" generally associated with the open format tests.

SUMMARY OF THE INVENTION

The test generation methodology of the present invention may combine the many advantages of multiple-choice format with the opportunity to test the examinee's knowledge and grasp of the subject matter presently possible through open format questions. Furthermore, some or all embodiments of the present invention may address and/or eliminate the disadvantages of either format.

One or more embodiments of the present invention may rely on the "Reverse Multiple-Choice Method" (RMCM), introduced and defined in U.S. patent application Ser. No. 09/951,132.

RMCM is a method of developing educational products or materials, including educational testing products and materials, by utilizing multiple-choice questions. As its name implies, RMCM represents a reversal of perspective from the ordinary multiple-choice approach. Starting with a given set of facts to be presumed (part of the "query" as noted above), the method may require one to examine each answer choice, and inquire how the set of facts to be presumed could be modified to make that answer choice the "correct" or "best" answer choice. If a given answer choice is already correct, no modification is needed. If a given answer choice is not correct, various modifications to the query may be employed, including changing some of the words or phrases, or other symbols or objects within the set of facts to be presumed.

Whereas the currently available educational products based on the multiple-choice format regard the set of facts to be presumed as "fixed," and "variably" examine the answer choices to pick the correct one, RMCM temporarily "fixes" an answer choice as the correct answer and "varies" the facts of the question to accommodate that assumption.

Through a process of leading the student to deconstruct and reassemble a question, RMCM provides a method for using the multiple-choice format in focusing the students on the art of closely reading the fact pattern, critically evaluating the answer choices, and learning to recognize the critical pieces of information in the fact pattern on which the answer choices turn. The skills learnt through this process, with or without the assistance of machine or human tutor, underlie the strength of RMCM as a self-study tool. Tests based on Reverse Multiple-Choice Method may be able to measure the extent to which the examinees have learnt these critical skills.

The distinction between the RMCM embodiments in the instructive context and the RMCM embodiments in the context of educational testing represents a slight shift in perspective: the focus in the context of instruction is on leading the student to discover the critical pieces of information in the given fact pattern, whereas the focus in testing is on evaluating the extent to which the test-taker has mastered the art of recognizing such critical pieces of information. This measure of the test-takers' ability to recognize critical pieces of information in the given fact pattern vis-à-vis the possible answer choices generally is the central goal of an educational testing regime; it is also a much more reliable predictor of their knowledge and understanding than the number of correctly answered multiple-choice questions on a standardized test.

One illustrative embodiment of the present invention for educational testing comprises a method comprising the steps of: (a) providing one or more multiple-choice questions, each question comprising a query and a plurality of answer choices, wherein said plurality of answer choices comprises one correct answer and one or more incorrect answers; (b) prompting the examinee to select an answer choice as the correct answer; (c) maintaining a record of the examinee's selection in step (b); (d) assigning credit for the examinee's selection of an answer in step (b) according to a preset formula; (e) prompting the examinee to select at least one of said plurality of answer choices not selected in step (b); (f) prompting the examinee to provide a follow-up query to which the answer choice selected in step (e) is a correct answer; (g) maintaining a record of the examinee's answer in step (e); (h) assigning credit for the examinee's selection of an answer in step (e) according to a preset formula; (i) combining the credit generated in steps (d) and (h) into a score for the question according to a preset formula; (j) evaluating the score, e.g., against a preset standard.

This process may be repeated for each of a specified number of questions, and a weighted total of all credit generated computed into examinee's final score. The final score may then be evaluated against a preset standard.

DETAILED DESCRIPTION

The Reverse Multiple-Choice Method of the present invention provides a novel methodology to utilize the multiple-choice question format to access, analyze, present and absorb the information embodied in the question and the accompanying answer choices.

As described above, the invention also comprises the production of related educational materials or products, for study and review as well as for testing, with or without interactive capability.

As noted above, it may be convenient to divide a multiple-choice question into two parts. The first part comprises a set of facts to be presumed and an interrogative sentence. The first part may also be termed a "query." As used herein, the terms "first part," "First_Part" and "query" shall be synonymous, unless otherwise noted. A second part of a question comprises a set of answer choices. As used herein, "second part" and "Second_Part" shall be synonymous, unless otherwise noted.

(In addition to the definition above, it may be convenient to think of the first part of a question as comprising the portion of a question not included in its second part.)

A correct answer (or "Correct_Answer") is the answer choice that will or would be graded on a test as the "correct" or "best" answer choice to a given query.

A first part of a question typically comprises one or more fact objects (or "Fact_Objects"). A fact object is defined to include any object, word, element, number, operator symbol, phrase, or a group of words, elements, numbers, operators, symbols, or other objects, or any other type of entity capable of holding information. A fact object typically denotes a fact, datum or piece of information in the first part of a multiple-choice question that may be considered when interpreting the answer choices or choosing an answer choice to the question. For instance, in the example discussed above of the box having sides of 1 foot, 2 feet and 3 feet, the length of each side may be considered a fact object. In a short story, each piece of information presented (which can be thought of as a word or group of words) may be considered a fact object. In a question on an art history exam, there may be a single fact object—the piece of artwork presented—and the interrogative sentence may ask the examinee to consider answer choices relating to the work or its creator to select the "correct" answer choice.

In one embodiment, where a fact object is a phrase or a group of words, elements, numbers, operators, symbols, or other objects or entities, the whole of such phrase or group—but no part less than the whole—of such phrase or group, denotes the particular fact, datum or piece of information contained in or conveyed by the fact object. The significance of a fact object may derive partly or primarily from the context of (including its placement within) the query and the set of answer choices of a particular multiple-choice question.

Ideally, in a carefully constructed multiple-choice question, every answer choice will utilize this contextual connection between the critical information content of the fact object or fact objects in the given query and the answer choice. Generally, an embodiment with minor variations can be used either for purposes of study or review, or for testing. For example, a student may be shown the fact objects corresponding to different answer choices to a question in side by side comparisons, whereas a test-taker might be called upon to match the fact objects (or their values) from a list to different answer choices in comparative displays.

In one embodiment of the present invention, a user is required to examine a query in view of the associated answer choices, and to modify the query such that an incorrect answer choice becomes a correct answer choice of the modified query (the "Reverse Multiple-Choice Variation Criterion"). In another embodiment, one or more modified queries may be presented to a user through educational materials such as a book, or on a computer screen. In yet a further embodiment, a teacher may present such modified queries to a student orally or on a blackboard.

Each of these embodiments can be extended to the educational testing situation in a self-evident manner. For example, the test-taker may be prompted to modify the query to an answer choice rejected by the test-taker as incorrect such that the incorrect answer becomes the correct answer to the modified query. This line of questioning, though amenable to simple grading techniques similar to the traditional multiple-choice format, may provide evidence of the test-taker's understanding of the subject matter beyond the simple selection of the correct answer on a multiple choice test.

For test questions based on this embodiment, a record of all correctly answered questions may be maintained; proper weights may be accorded to the selection of the correct answer and to the modification of the query corresponding to the answer choice selected by the test-taker as an incorrect answer, which weights would depend on the subject matter tested and may be determined by the test writers; numerical credit for the question may then be computed based on a weighted combination according to preset formulas appropriate to the subject matter tested; and, finally numerical credit for all test questions may be compiled into a single score or grade. A grade obtained in this manner may provide a higher degree of confidence in the test-taker's mastery of the subject matter than the multiple-choice tests in current use, for a smaller loss of uniformity and efficiency than the introduction of open format questions.

In a preferred embodiment of Reverse Multiple-Choice Method, the variation criterion used is the Reverse Multiple-Choice Minimality Criterion: for each answer choice, the modification of the query is required to involve the minimum number of changes to fact objects such that the answer choice will become the correct answer to the modified question. In other embodiments, this criterion need not be employed, and the number of changes to fact objects may be any desired number or an unspecified number.

The introduction of additional language may be useful for understanding certain embodiments. A modified query for which a particular answer choice is the correct answer may be called a query_variant (or "query variant") for the answer choice. If a particular answer choice is the correct answer to the unmodified query, then no change in the fact objects of the query will be needed; otherwise, one or more possible modifications of the query will generally exist, and each query so modified may be selected as a query variant for the answer choice. The set of all possible query variants corresponding to an answer choice will form the query variant_set (or "variant set") corresponding to the answer choice. This set may be finite, or it may be infinite. The set of query variants corresponding to an answer choice will be the empty, or null set if, and only if, no modification of the query exists that will make a particular answer choice the correct answer.

In some cases, changing one fact object may be sufficient to produce a query variant, while in other cases many fact objects (possibly even every fact object) may have to be changed.

It is possible for two query variants to be isomorphic in the sense that one query variant differs from the other query variant only by trivial differences of fact objects. In most embodiments of the invention two isomorphic query variants may be assumed to offer equivalent credit for the question on a test.

A reference to a "complete" set of variants corresponding to an answer choice signifies that every possible query variant for the answer choice is identified. A "partial" set of query variants is a proper subset of the "complete" set of query variants for the answer choice. Finally, the RMCM answer to a multiple-choice question is defined as the aggregation of sets of query variants for all the answer choices of the question.

An RMCM_Answer may steer the student's attention to a comparison of the nuances which distinguish the answer choices, and the key words, phrases or facts on which those distinctions rest. RMCM may require a student to deconstruct and reassemble a question, which may be a promising training exercise in critically examining a given set of facts. Because the structure of RMCM rests on the identification and replacement of actual words, phrases or objects in queries, the method may offer a structure, basis and/or opportunity for concrete communication between a student and a tutor or teacher. Therefore, RMCM may provide a promising and natural framework for the development of interactive tutorial instruction programs, specially in the context of computer-based and distance-learning, as well as a method for in-depth assessment and evaluation of a student's progress.

Two illustrative embodiments of the present invention will now be described with reference to the appended figures.

Figure 1:
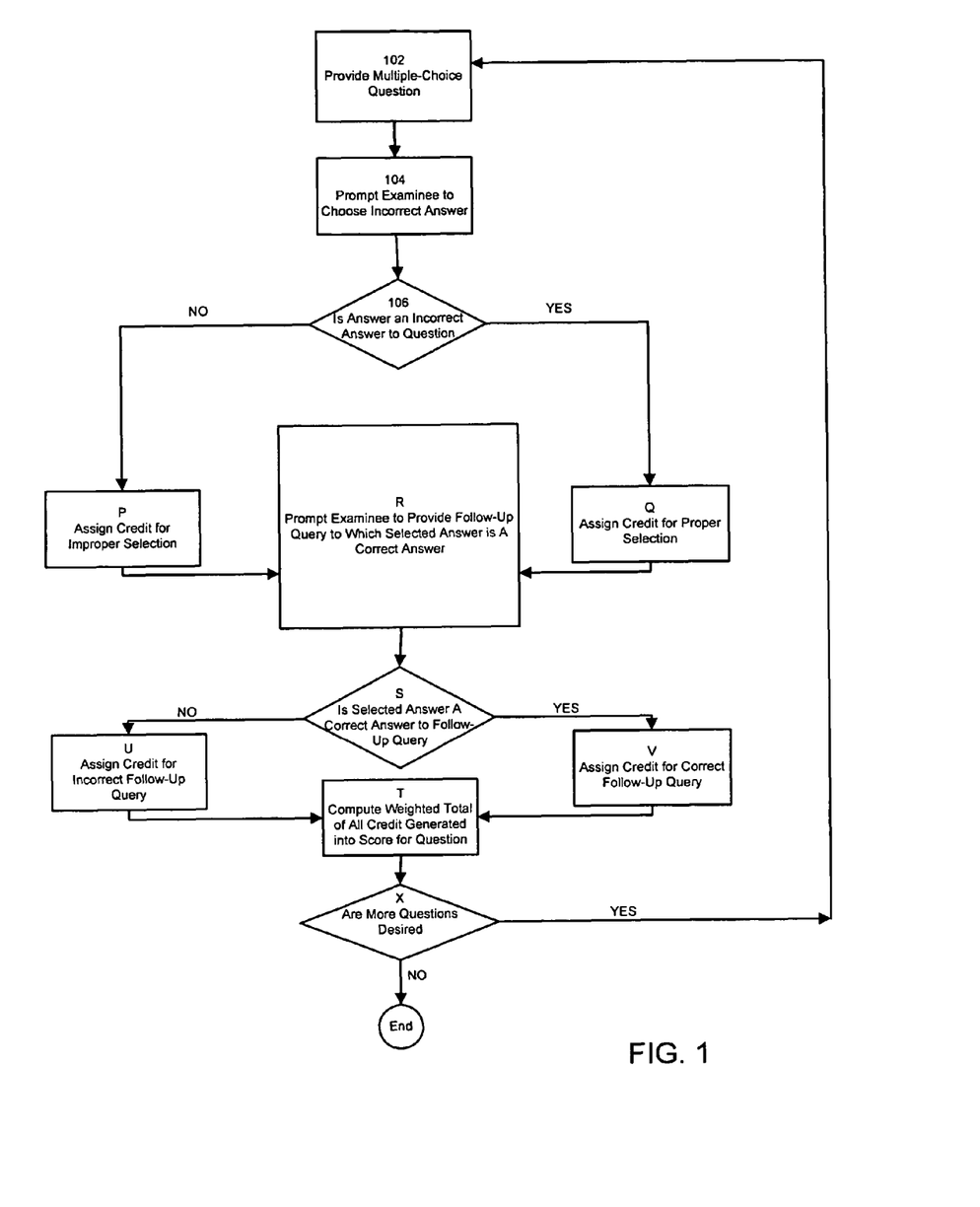
FIG. 1 is a high-level flow chart showing one illustrative embodiment of a method of the present invention directed to educational testing.

As shown in FIG. 1, at step 102 a multiple-choice question is provided to the examinee. In one embodiment, the question may be provided orally or in writing by a teacher or a tutor. In another embodiment, the question may be provided by a computer or over a telecommunications network such as the internet. In yet other embodiments, the question may be provided in any medium suitable for educational purposes, including a book. A multiple-choice question provided for purposes of the present invention may be a conventional multiple-choice question, available through existing sources. Alternatively, it may be written with the present invention in mind. The present invention may pertain or relate to any type of multiple-choice question, regardless of medium or subject matter, and regardless of whether the question now exists or is later developed.

At step 104 the examinee is prompted to choose one of the answer choices in the second part of the question as an incorrect answer. In step 106 the examiner or a testing computer program determines if the chosen answer is incorrect; credit for this part of the question is assigned in steps P and Q according to a preset formula based on the content of the question. The credit for this part of the question generally is expected to be higher for successfully picking an incorrect answer and lower (or none) for selecting a correct answer as incorrect. In some embodiments, the examinee may be permitted repeated attempts to choose the answer to this part of the question, therefore resulting in repeated executions of steps P and Q. In other embodiments, either or both of steps P and Q may be omitted; for instance, if the embodiment permits the examiner to affirmatively point out an incorrect answer to the examinee (so that the examinee does not have to make the selection) and ask the examinee to modify the query so that the incorrect answer is the correct answer to the modified query.

In step R the human or automatic examiner asks the examinee to provide a follow-up query to which the selected (incorrect) answer is a correct answer. In step S the examiner determines whether the selected answer is a correct answer to the follow-up query. Appropriate credit is generated in steps U and V for this part of the question, and total credit for the question is computed in step T. A determination is made if more questions need to be asked in step X, and control is returned either to step 102 with a new question or to the end of the testing session.

In other illustrative embodiments the examinee may be prompted to change, identify or find the fact objects from a given list in step R so as to produce an appropriate follow-up query. The logical control of these embodiments will be analogous to that depicted in FIG. 1. Yet other embodiments may be provided wherein the examinee is asked to match fact objects in the given query to all of the answer incorrect answer choices. Further embodiments of the invention for testing purposes may be later developed that similarly utilize the connection between incorrect answer choices and fact objects in order to elicit information about the test-takers' mastery of the subject matter tested.

Figure 2:
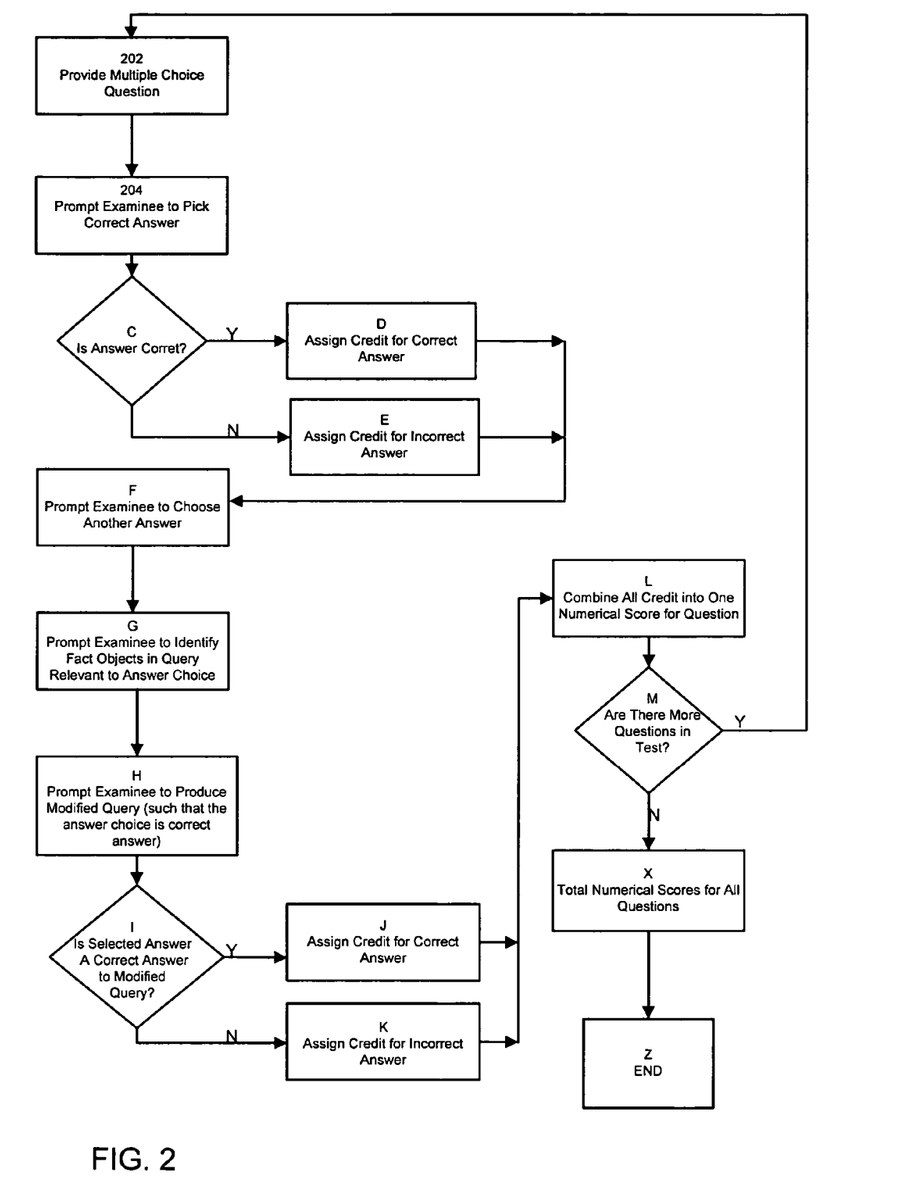
FIG. 2 is a high-level flow chart for another illustrative embodiment of the method of the present invention directed to educational testing.

The illustration of the embodiment shown in FIG. 2 starts at step 202 where a multiple-choice question is provided to the examinee. The considerations for alternative embodiments stated in relation to step 102 of FIG. 1 apply as well to step 202 of FIG. 2.

As noted above, the multiple-choice question provided generally comprises a query and a set of answer choices. In step 204 the examinee is prompted to select an answer choice as the correct answer to the question. Selection of an answer choice may, in some embodiments, be carried out via a computer or over a communications network such as the internet. Alternatively, selection of an answer choice may be oral or may be accomplished by any other suitable means of communication now known or later developed. In some cases, the teacher or examiner may select a correct answer to the question and present it to the examinee for further steps of the embodiment; in these cases the assignment of numerical score for the question may be appropriately modified. In yet other cases, a computer may select an answer choice as correct answer at this step of the method.

In step C the examiner or a computer makes a determination whether the answer is correct. If the selected answer choice is correct, credit may be generated for this part of the question and a record maintained of the credit in step D. If the answer is incorrect, appropriate credit for the incorrect answer (generally none or lower than the credit for correct answer) may be generated and a record maintained step E.

The examinee is then prompted in step F to choose another answer from the remaining (incorrect) answer choices that examinee did not choose as correct answer. In step G the examinee is prompted to identify the fact objects in the given query which may be changed so that the incorrect answer choice would be correct answer to the modified query. The examinee may be prompted in some embodiments to simply identify fact objects to change, and in other embodiments to actually change fact objects or to produce the modified query (as depicted in step H). This latter step H is optional. Yet other embodiments may prompt the examinee to select fact objects for change from a proposed list or to match lists of fact objects to change corresponding to different answer choices. Other embodiments may ask for iterative modifications to the query or the fact objects corresponding to more than one incorrect answer, or to all the incorrect answer choices presented, or to apportion or combine credit for several parts of the question in different ways to for the purpose of getting information about the test-taker's understanding and grasp of the subject matter tested or other specific application criteria.

A determination is made in step I of the embodiment illustrated in FIG. 2 whether the selected incorrect answer is a correct answer to the modified query. Appropriate credit for this part of the question may be generated in steps J and K, and in step L all credit generated for the question may be combined and a record maintained for total credit for the question. The embodiment illustrated in FIG. 2 provides multiple-choice questions until no more questions remain in the test, when it ends after producing an aggregate numerical score based on the credit generated for all questions. Other embodiments, now available or developed in the future, may change the order or manner in which the questions are presented, credit for correct or incorrect response for each question is generated or combined, or the score is computed for the test.

As shown generally at decision block M, another question may be provided or may not be provided, depending on a variety of circumstances. For instance, if a book of questions has been completed, another question may not be desired, and the process may proceed to step X, wherein the final score for the test-taker is computed for the test, and to its end in step Z. Alternatively, if a pre-set number of questions have been answered on a computer or interactive embodiment, the process may also proceed to step Z. As one of skill in the art will readily understand, the logic and criteria within decision block M may be varied depending on the circumstances of a particular application.

In other embodiments, decision block C may not be present, and the process may continue directly to step F even if the selected answer choice is correct, without determining whether an additional question is desired. In particular, in some embodiments, it is desirable to apply the portion of the RMCM method represented by steps F, G and H to a question, regardless of whether the first answer choice selected is the correct answer. This may be accomplished by presenting certain information, described in more detail below, in a book or on a computer screen, or it may be accomplished by an oral discussion of the information, or through any other appropriate, known or later-developed means.

As noted above, at step G, the examinee may be prompted to identify fact objects in the query. Alternatively, the fact objects may be identified in one embodiment by a computer program or in another embodiment by highlighting or bolding in a book. Any other appropriate means of identifying the fact objects may also be employed. In some embodiments, the fact objects need not necessarily be identified explicitly, and step G may be removed.

At step H, the examinee or test-taker is prompted to produce a modified query. In one embodiment, an examinee may be asked to produce the modified query, for instance by examining the fact objects in the query in view of the selected answer choice. In another embodiment, modified queries may be pre-stored in computer memory, or may be generated by computer software such as an expert system and the examinee may be allowed to view and answer other questions based on the displayed material. The examinee may be permitted, in some embodiments, multiple attempts to answer any, several or all of the given multiple-choice questions or other questions based on the displayed questions.

As shown at steps I and M, if the selected answer choice is a correct answer to the modified query, and another question is desired, another question may be provided. Alternatively, if the selected answer choice is not a correct answer to the modified query, the examinee may be asked to produce another modified query rather than proceeding through step K. In some embodiments, a limited number of such attempts may be permitted before a new question is provided or the process is ended entirely.

In other embodiments, when a selected answer choice is a correct answer to the modified query, steps 204, C to M may be performed again, for another answer choice. It may sometimes be desirable to produce modified queries to which each of the answer choices provided are correct answers. In other cases, modified queries may be provided corresponding to less than all of the answer choices. As discussed in some detail above, these modified queries may be generated by a student or test-taker, or may be generated for inclusion in a book or other educational materials provided to the student, or may be provided by a computer program or over the internet There are many ways in which one or more fact objects in a query may be changed to produce a modified query. In some cases, the fact objects may be changed by a user or a student, in view of the particular answer choice selected. In other cases, the fact objects may be changed by individuals other than the user or student, to generate modified queries that may be provided to the user or student in the form of educational materials such as a book, as discussed above. In yet other cases the fact objects may be changed in any known or later-developed automated or un-automated fashion by a computer or computer system or network.

A student may use these modified queries, or their compilations, as a study aid to determine why the differences between the modified queries and the unmodified queries lead to different correct answers. Conversely, an examiner may quiz the test-taker on these materials to monitor the student's progress and readiness for advancement in the curriculum.

Since grading multiple-choice questions incorporating RMCM is similar in method to grading standard multiple-choice tests, parts of such materials may be written for inclusion within the standardized assessment tests administered to large numbers of students.

RMCM may also provide a framework to serve as the basis for the development of objective measures of the difficulty of a test question. A typical example of a relatively "easy" multiple-choice question is a question where the RMCM_Variant_Set corresponding to the correct answer consists of RMCM_Variation_Identity and the RMCM_Variant_Sets corresponding to each of the incorrect answers consist of sets of completely different queries. Near the opposite extreme may be a difficult multiple-choice question, for which corresponding to each answer choice all the RMCM_Variants differ from the given question by just one word or symbol. In other words, generally, the greater the number of fact objects that must be changed to produce a modified query to which a selected answer is a correct answer, the harder the question.

Different measures of difficulty of a question between the two extremes may depend on a set of parameters which include the cardinality of each RMCM_Variant_Set and the extent of variation required for each incorrect answer, as well as the number of answer choices for which considerations of cardinality and extent of variation are complex. While the development of these detailed measures of difficulty based on the RMCM approach may still need to incorporate the accepted pedagogic principles of educational and statistical measurement, they may add reliable components of testing and evaluation generally not achievable through statistical measurement alone.

In general, statistical measures of difficulty of tests, and methods of correction of results based on those measures, depend on comparisons of populations of test-takers but not on content of the test questions. Those comparisons may not provide reliable results if the underlying assumptions for entire examinee populations are biased. For example, if a test question was "difficult" for the examinees in country C in one year, it may be graded as a difficult question in the following year in country C. However, the same question may not be regarded as difficult by the student populations at the same academic level in other years or other countries, but there would be no way to determine such a fact in the absence of statistical data. By additionally utilizing the RMCM approach, it may be possible to develop methods of educational measurement that depend more closely on the subject matter tested, and therefore, allow for more objective comparisons between diverse examinee populations.

For explanatory purposes, variations of an example of an educational testing question consistent with one or more of the aforementioned embodiments are reproduced below. The question is Question 4 from the 2001 MCAS Tests for $10^{th}$ grade, released by the Massachusetts Department of Education, and reported in The Boston Globe on Tuesday, Jun. 19, 2001 (incorporated herein by reference).

Question 4

The sophomore class plans to sell T-shirts with the school's name on them. The cost of each T-shirt alone is $3.50, and the printing cost of each shirt is $0.75. If the class plans on selling each printed T-shirt for $11, what expression can you use to calculate the class profit for selling n printed T-shirts?

A. $11.00-(3.50+0.75)n$
B. $11.00n-(3.50+0.75)$
C. $11.00-3.50-0.75n$
D. $(11.00-3.50-0.75)n$ (The correct answer to this question is D.)

1.

Test question based on Question 4 compatible with a first embodiment of RMCM:

From the given answer choices A, B, C or D for Question 4, choose an answer that you believe is incorrect. Your task is to change Question 4, so that the chosen incorrect answer becomes the correct answer to the changed question.

Discussion:

The expected modified query produced in response to this question depends on the answer chosen by the test-taker.

If the chosen answer is A, the expected modified query is:

The sophomore class plans to sell T-shirts with the school's name on them. The cost of each T-shirt alone is $3.50, and the printing cost of each shirt is $0.75. If the class plans on selling all of the printed T-shirts for $11, what expression can you use to calculate the class profit for selling n printed T-shirts?

If the chosen answer is B, the expected modified query is:

The sophomore class plans to sell T-shirts with the school's name on them. The cost of all the T-shirts alone is $3.50, and the printing cost of all the shirts is $0.75. If the class plans on selling each printed T-shirt for $11, what expression can you use to calculate the class profit for selling n printed T-shirts?

If the chosen answer is C, the expected modified query is:

The sophomore class plans to sell T-shirts with the school's name on them. The cost of all the T-shirts is $3.50, and the printing cost of each shirt is $0.75. If the class plans on selling all the printed T-shirts for $11, what expression can you use to calculate the class profit for selling n printed T-shirts?

If the chosen answer is D, then it may indicate that the student lacks understanding of the material tested. In general, selection of answer D may imply complete loss of credit for the question.

The test writer may apportion partial credit for the question depending on the selection of a particular answer choice, on the test-taker's selection of fact objects to change, on the nature of the attempted change or on the structure of the modified query produced. Practitioners of the art of writing test questions may choose to apportion partial credit for a question based on other criteria in a given subject matter.

2.

Test question based on Question 4 (above) compatible with a second embodiment:

From the given answer choices A, B, C or D for Question 4, choose an answer that you believe is incorrect. Your task is to find words, groups of words, phrases or values to change in Question 4, so that the chosen incorrect answer becomes the correct answer to the changed question.

Discussion:

The expected response to this question depends on the answer chosen by the test-taker.

If the chosen answer is A, the expected response is:

Change 'selling each printed T-shirt' to 'selling all of the printed T-shirts.'

If the chosen answer is B, expected response is:

Change 'cost of each T-shirt' to 'cost of all T-shirts,' and change 'printing cost of each shirt' to 'printing cost of all the shirts.'

If the chosen answer is C, the expected response is:

Change 'cost of each T-shirt' to 'cost of all the T-shirts,' and change 'selling each printed T-shirt' to 'selling all the printed T-shirts.'

If the chosen answer is D, then it may indicate that the student lacks understanding of the material tested and may imply complete loss of credit for the question. As noted in the discussion of the previous example, the test writer may apportion partial credit for the question based on partially correct attempts to answer the question or other specific criteria.

3.

Test question based on Question 4 (above) compatible with a third embodiment:

From the given answer choices A, B, C or D for Question 4, choose an answer that you believe is incorrect. Your task is to identify words, groups of words, phrases or values to change in Question 4, so that the chosen incorrect answer becomes the correct answer to the changed question.

Discussion:

The expected response to this question depends on the answer chosen by the test-taker.

If the chosen answer is A, the expected response is:

Change 'selling each printed T-shirt.'

If the chosen answer is B, the expected response is:

Change 'cost of each T-shirt' and change 'printing cost of each shirt.'

If the chosen answer is C, the expected response is:

Change 'cost of each T-shirt' and change 'selling each printed T-shirt.'

If the chosen answer is D, it may indicate test-taker's lack of understanding of the subject matter. Regarding partial credit, considerations similar to the previous examples apply.

4.

Test question based on Question 4 (above) compatible with a fourth embodiment:

From the given answer choices A, B, C or D for Question 4, choose an answer that you believe is incorrect. Your task is to identify words, groups of words, phrases or values from the list below which may be changed in Question 4, so that the chosen incorrect answer becomes the correct answer to the changed question:

List: 'cost of each T-shirt;' 'alone;' '$3.50;' 'printing cost of each shirt;' '$0.75;' 'selling each printed T-shirt;' '$11;' 'profit;' 'selling n printed shirts.'

Discussion:

The expected response to this question depends on the answer chosen by the test-taker.

If the chosen answer is A, the expected response is: 'selling each printed T-shirt.'

If the chosen answer is B, expected answer is: 'cost of each T-shirt' and 'printing cost of each shirt.'

If the chosen answer is C, expected answer is: 'cost of each T-shirt' and 'selling each printed T-shirt.'

As before, if the chosen answer is D, it may indicate test-taker's lack of understanding of the subject matter. Also, partial credit considerations similar to the previous examples apply.

5.

Test question based on Question 4 (above) compatible with a fifth embodiment:

Consider the given answer choices A, B, C or D for Question 4 that has one and only one correct answer. Your task is to identify the words, groups of words, phrases or values from the list below which may be changed in Question 4, so that each incorrect answer choice becomes a correct answer to a changed question, and to match each word, group of words, phrase or value so changed to the appropriate answer choice. Do not fill in the blank corresponding to an item in the list that does not need to be changed. If the listed fact object(s) is/are appropriately changed, the answer choice will become the correct answer to the changed question.

| Fact Objects | Answer | (Expected answer) |
|---|---|---|
| 'cost of each T-shirt' | ________ | (B) and (C) |
| 'alone' | ________ | |
| '$3.50' | ________ | |
| 'printing cost of each shirt' | ________ | (B) |
| '$0.75' | ________ | |
| 'selling each printed T-shirt' | ________ | (A) and (C) |
| '$11' | ________ | |
| 'profit' | ________ | |
| 'selling n printed shirts' | ________ | |

Discussion:

This example uses the familiar matching task with RMCM's innovative use of incorrect answer choices to assess the test-taker's understanding of the subject matter. By counting the number of rightly or wrongly filled-in blanks, this task may nevertheless provide a deeper measure of the test-taker's grasp of the subject matter in an efficient, objective and uniform manner.

These illustrative examples show how the traditional testing tasks may be combined with RMCM's unconventional use of incorrect answer choices in other embodiments to measure the test-taker's understanding of the subject matter. While these illustrative examples pertain to a high school level achievement test in basic mathematics, similar techniques of this invention may be used to write test questions in other subject areas. Practitioners in the art of writing test questions will readily recognize how to incorporate the methodology of RMCM and develop embodiments that will be appropriate for writing tests in diverse subject areas.

Having now described a few illustrative embodiments, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

I claim:

1. A computerized testing method comprising the steps of:
   (a) providing, in a computer, one or more multiple-choice questions and displaying those questions on an output device of the computer, each question comprising a query and a plurality of answer choices, wherein said plurality of answer choices comprises one correct answer and one or more incorrect answers;
   (b) for at least one of said one or more incorrect answers, prompting a test-taker to produce, and enter into an input device of the computer, a follow-up query to which said one of said one or more incorrect answers is a correct answer;
   (c) determining by said computer or by at least one computer connected to the computer via a computer network or a communication network, if said one of said one or more incorrect answers is a correct answer to said follow-up query.

2. The method of claim 1, wherein said determining is by comparing said follow-up query with at least one computer generated query to which said one of said one or more incorrect answers is a correct answer.

3. The method of claim 1, wherein said determining is by comparing said follow-up query with at least one query from a database of stored queries accessible to the computer to which said one of said one or more incorrect answers is a correct answer.

4. The method of claim 1, wherein said follow-up query is a modification of said query.

5. The method of claim 1, wherein said at least one of said one or more incorrect answers is all of said incorrect answers.

6. The method of claim 1, wherein said at least one of said one or more incorrect answers is selected by the test-taker.

7. The method of claim 1, wherein the test-taker is prompted to find and modify fact objects in said query to produce said follow-up query.

8. The method of claim 1, wherein the test-taker is prompted to identify fact objects from a list of fact objects requiring modification to produce said follow-up query.

9. The method of claim 8, wherein the test-taker is prompted to modify one or more identified fact objects from said list to produce said follow-up query.

10. The method of claim 1, comprising the further step of:
    (d) prompting the test-taker to produce, and enter into an input device of the computer, a second follow-up query different from said follow-up query, to which said at least one of said one or more incorrect answers is a correct answer.

11. The method of claim 10, wherein the test-taker is prompted to produce said second follow-up query if it is determined that said one of said one or more incorrect answers is not a correct answer to said follow-up query.

12. The method of claim 10, wherein the test-taker is prompted to produce said second follow-up query to which a second one of said one or more incorrect answers is a correct answer.

13. A computerized testing method comprising the steps of:
    (a) providing, in a computer, one or more multiple-choice questions and displaying those questions on an output device of the computer, each question comprising a query and a plurality of answer choices, wherein said plurality of answer choices comprises one correct answer and one or more incorrect answers;
    (b) prompting a test-taker to review, on an output device of the computer, one of said multiple choice questions;
    (c) prompting the test-taker to select, and enter into an input device of the computer, an answer choice to said question;
    (d) prompting the test-taker to deteiuiine if said answer choice is an incorrect answer; and
    (e) prompting, on an output device of the computer, the test-taker to review a follow-up query and determine whether said answer choice is a correct answer to said follow-up query;
    (f) evaluating by using the computer, or computer network or communication network if the test-taker correctly determined whether said answer choice is a correct answer to said follow-up query.

14. The method of claim 13, further comprising the steps of:
    (f) prompting the test-taker to select another answer choice; and
    (g) if it is determined that said another answer choice an incorrect answer, then prompting the test-taker to produce and enter another follow-up query to which said another answer choice is a correct answer.

15. A non-transitory computer-readable storage medium encoded with a plurality of instructions that, when executed by a computer, performs a method comprising:
    (a) providing one or more multiple-choice questions and displaying those questions on an output device of the computer, each question comprising a query and a plurality of answer choices, wherein said plurality of answer choices comprises one correct answer and one or more incorrect answers;

(b) prompting a test-taker to review, on an output device of the computer, one of said multiple choice questions;

(c) prompting the test-taker to select, and enter into an input device of the computer, one of said one or more incorrect answers;

(d) providing, on an output device of the computer, a follow-up query;

(e) prompting, on an output device of the computer, the test-taker to review said follow-up query and determine whether said one of said one or more incorrect answers is a correct answer to said follow-up query; and (f) evaluating by using the computer, or computer network or communication network if the test-taker correctly determined whether said answer choice is a correct answer to said follow-up query.

16. The computer-readable storage medium of claim 15, wherein steps (c), (d) and (e) are repeated for one or more of said one or more incorrect answers.

17. A computerized testing method comprising the steps of:

(a) providing, in a computer, one or more multiple-choice questions and displaying those questions on an output device of the computer, each question comprising a query and a plurality of answer choices, wherein said plurality of answer choices comprises one correct answer and one or more incorrect answers;

(b) prompting, on an output device of the computer, a test-taker to select a correct answer to one of said one or more multiple-choice questions;

(c) maintaining, in the computer, a record of the test-taker's selection of an answer choice;

(d) assigning credit for the test-taker's-selection of said answer choice according to a preset formula based, at least in part, on whether the test-taker's selection is a correct answer to said one of said one or more questions;

(e) prompting the test-taker to select another answer choice from said plurality of answer choices;

(f) prompting, on an output device of the computer, the test-taker to provide a follow-up query to which said another answer choice from said plurality of answer choices is a correct answer;

(g) maintaining a record of the test-taker's selection of said another answer choice;

(h) assigning credit for the test-taker's selection of said another answer choice according to another preset formula based, at least in part, on whether the another answer choice is an incorrect answer to said one or said one or more questions;

(i) determining, by the computer or by at least one computer connected to the computer via a computer network or communication network, if said another answer choice from said plurality of answer choices is a correct answer to said follow-up query;

(j) assigning credit according to another preset formula based, at least in part, on the determination of whether said another answer choice is a correct answer to said follow-up query;

(k) combining the test-taker's assigned credit into a score for the question according to a preset formula based, at least in part, on the credits assigned in steps (d), (h), and (j); and (l) evaluating said score against a preset standard.

18. The method of claim 17, wherein the method is carried out as a distance learning application over a computer network or a communications network.

19. The method of any of claim 1, 13, 15 or 17, further comprising the step of compiling in a medium suitable for educational purposes said multiple-choice questions and follow-up queries, or fact objects modifiable to produce follow-up queries, to which one or more of said plurality of answer choices are correct answers.

20. The method of claim 19, wherein said medium is a computer-readable medium.

21. A computerized testing method comprising the steps of:

(a) receiving data from a computer network or communication network, wherein the data comprises a first part which may be interpreted as a query of a multiple-choice question, a second part which may be interpreted as a plurality of answer choices of a multiple-choice question, and one or more lists of segments of said query which may be interpreted as fact objects that identify facts that may be used to answer a multiple-choice question; and (b) assembling by a computer connectable to the computer network or communication network, one or more multiple-choice questions from said data, wherein said plurality of answer choices comprises one correct answer and one or more incorrect answers to at least one of said one or more multiple-choice questions;

(c) displaying at least one of said one or more multiple-choice questions to a test-taker;

(d) prompting the test-taker to reassemble parts of the displayed at least one multiple-choice question into a reassembled multiple-choice question, wherein at least one incorrect answer for the displayed at least one multiple-choice question is a correct answer to the reassembled multiple-choice question;

(e) prompting the test-taker to enter into an input device of the computer said reassembled multiple-choice question;

(f) determining by at least one computer connectable to the computer network or communication network if said one of said plurality of answer choices is a correct answer to the reassembled multiple-choice question; and (g) assigning credit for the reassembled multiple-choice question based on a preset formula.

* * * * *